US006606930B2

(12) United States Patent
Fasnacht et al.

(10) Patent No.: US 6,606,930 B2
(45) Date of Patent: Aug. 19, 2003

(54) SAW CUTTING GUIDE

(76) Inventors: Samuel Mitchell Fasnacht, 318 E. Plum St., Mankato, MN (US) 56001; Michael Fred Oas, 208 Hudson Ave., Mankato, MN (US) 56001

( * ) Notice: Subject to any disclaimer, the term of this patent is extended or adjusted under 35 U.S.C. 154(b) by 9 days.

(21) Appl. No.: 09/876,399

(22) Filed: Jun. 7, 2001

(65) Prior Publication Data

US 2002/0184980 A1 Dec. 12, 2002

(51) Int. Cl.$^7$ ................................................. B26D 7/02
(52) U.S. Cl. ..................................... 83/468.3; 83/468.7
(58) Field of Search ........................... 83/13, 148, 162, 83/184, 270, 271, 278, 331, 391, 397.1, 398, 761, 802, 468.3, 468.7; 30/376; 26/7

(56) References Cited

U.S. PATENT DOCUMENTS

| | | |
|---|---|---|
| 1,716,662 A | 6/1929 | Pedley |
| 2,217,923 A | 10/1940 | Silverman |
| 2,352,432 A | 6/1944 | Harrington |
| 2,367,432 A | 1/1945 | Reprogle |
| 2,487,327 A | 11/1949 | Ganter, Jr. |
| 2,617,186 A | 11/1952 | Pickles |
| 2,839,103 A | 6/1958 | Prince et al. |
| 4,625,405 A | 12/1986 | Hudnutt et al. |
| 4,951,540 A | 8/1990 | Cross et al. |
| 5,090,283 A | * 2/1992 | Noble ........................ 83/467.1 |
| 5,249,495 A | * 10/1993 | Renk ........................... 83/468.3 |
| 5,758,425 A | 6/1998 | Gallagher et al. |
| 5,787,781 A | 8/1998 | Hile |

OTHER PUBLICATIONS

"Shingle Shear" Advertisement, *Fine Home Building*, Mar. 2001, p. 14.

* cited by examiner

Primary Examiner—Paul T. Sewell
Assistant Examiner—M. Chambers
(74) Attorney, Agent, or Firm—Moore, Hansen & Sumner

(57) ABSTRACT

The present invention discloses a cutting guide that permits the use of a power saw in trimming roofing materials in the installation of those roofing materials. The cutting guide may be constructed as an accessory or as a contiguous roofing material cutting apparatus and generally comprises a mounting plate for coupling a power saw to the cutting guide, a post extending downwardly from the mounting plate in general alignment with a blade of the power saw, and a base that supports the power saw and cutting guide and which has at least one lateral edge that is arranged substantially parallel with the blade of the power saw at a predetermined offset distance therefrom. The cutting guide of the present invention may be readily configured to trim roofing materials such as shingles, membranes, shakes, or tiles in roof valleys, at ridges, and at the gable end of a roof.

18 Claims, 7 Drawing Sheets

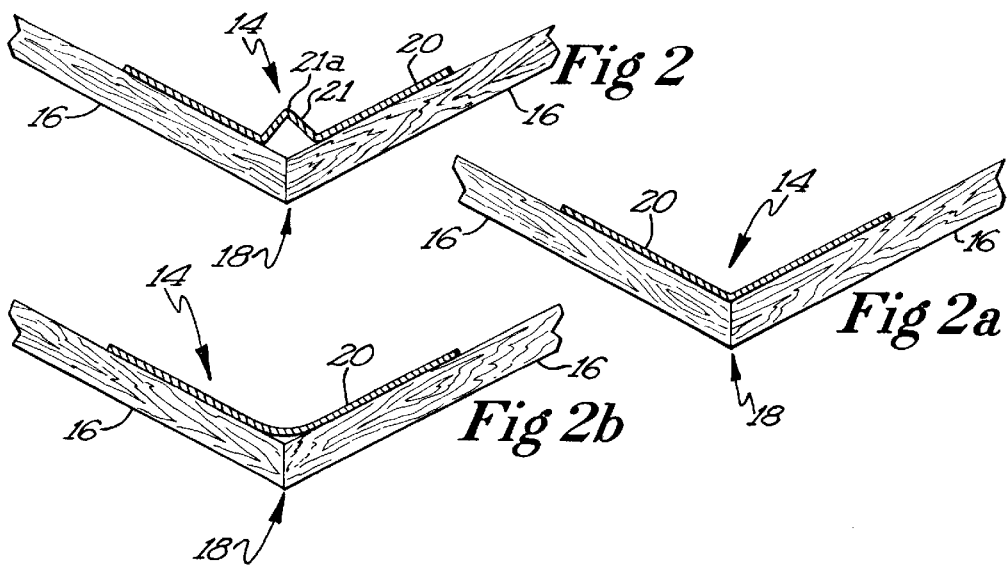
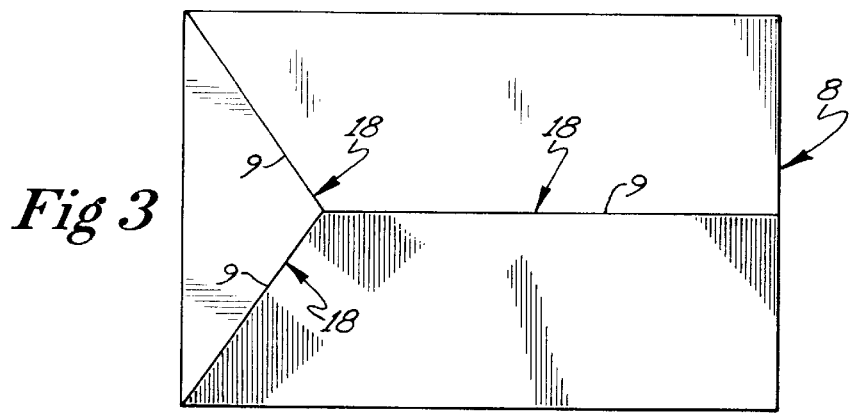
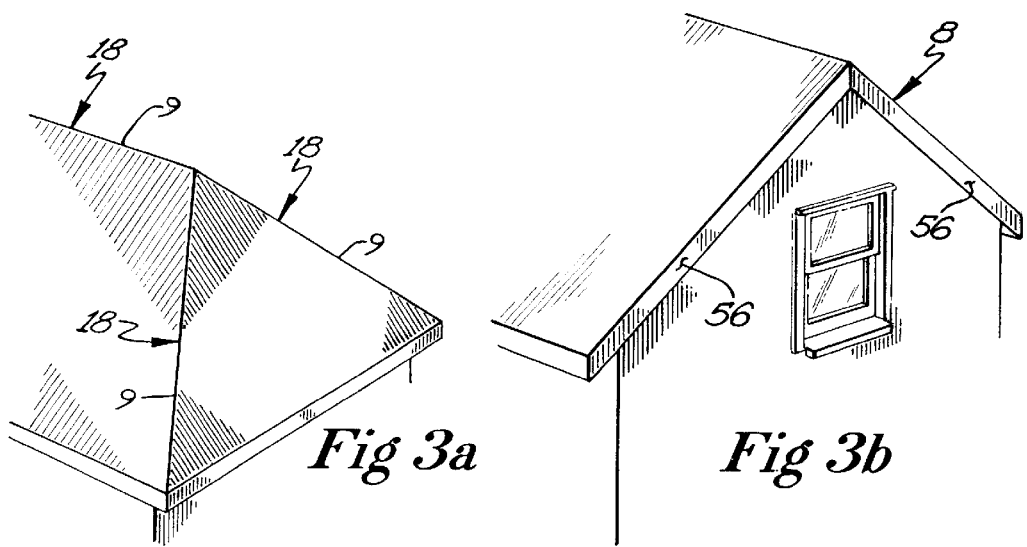

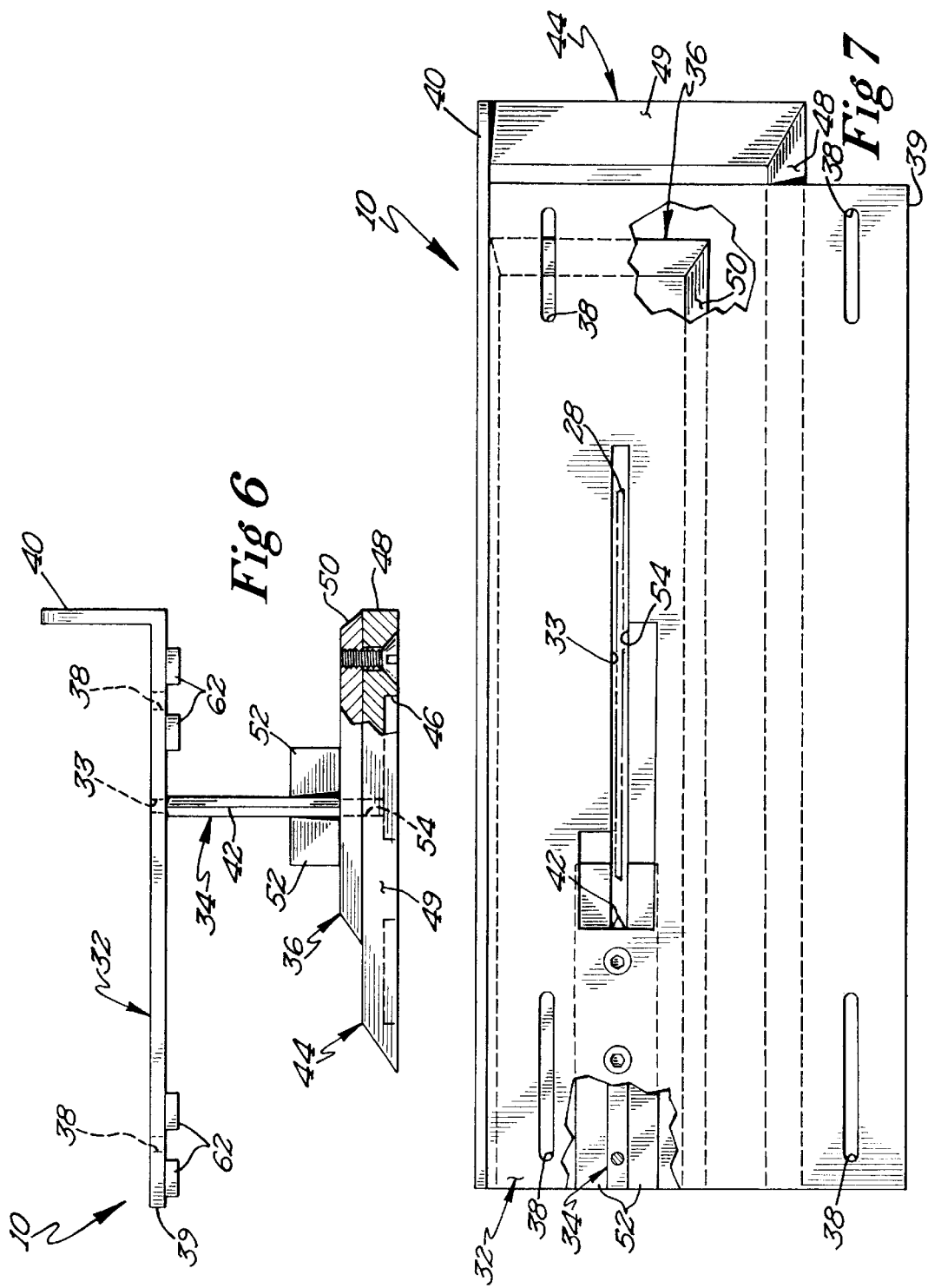

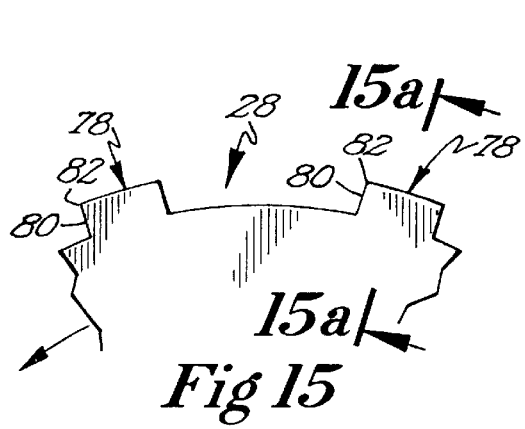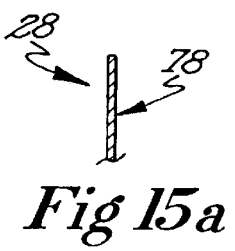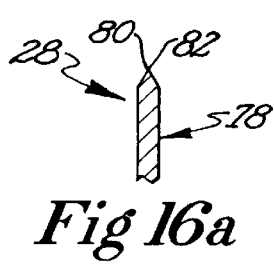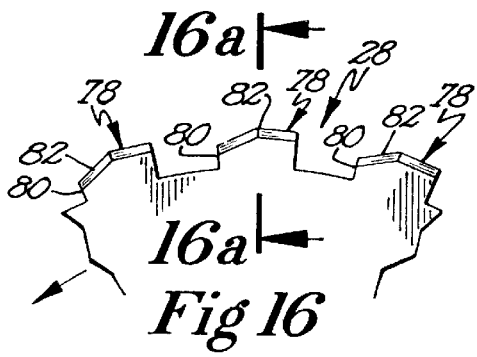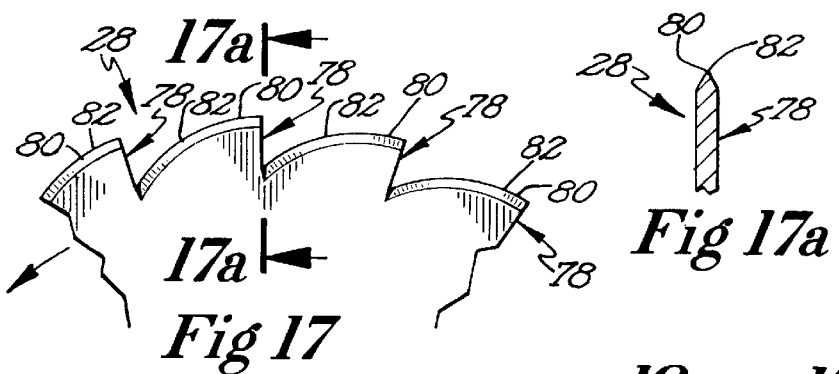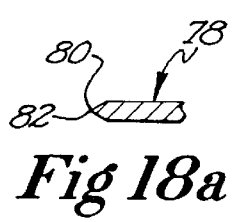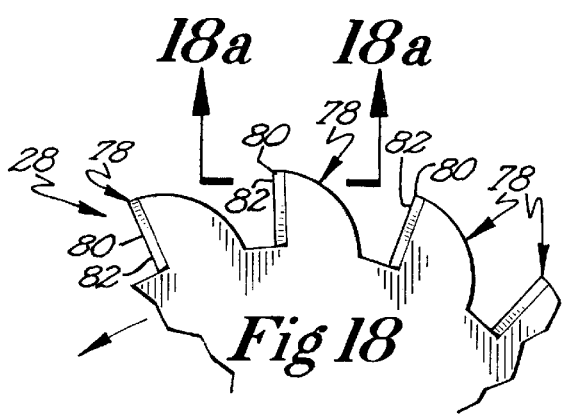

SAW CUTTING GUIDE

CROSS REFERENCE TO RELATED APPLICATIONS

None.

FIELD OF THE INVENTION

The present invention relates to a mechanism for use in trimming or cutting roofing materials such as shingles, shakes, or membranes. More specifically, the present invention is drawn to a cutting guide that directs a cutting blade through a given roofing material at a predetermined offset from a given feature of a roof structure.

BACKGROUND OF THE INVENTION

Heretofore, one of the most time consuming and hence costly procedures in applying roofing materials such as shingles, shakes, tiles, and membranes to roofs has been the hand trimming of the roofing material at or near the valleys, ridges and gable ends of a roof. FIG. 1 illustrates a typical roof valley that is covered with shingles. A valley 14 is the concave juncture of two non-planar roof surfaces. Typically this juncture comprises a seam 18 formed in the sheathing material 16 used to form the roof. For this reason, it is common practice to utilize a water proofing structure known as a valley flashing 20 to prevent water from entering the seam 18 formed at the juncture between the two adjoining roof surfaces. A valley flashing 20 comprises a water impervious material that is preferably a non-corroding metal such as copper or galvanized tin or steel that is nailed in place over the seam 18 between the two adjoining roof surfaces as illustrated in FIG. 1. Preferably a crease or creases are formed along the longitudinal centerline of the valley flashing so that the flashing 20 will conform to the valley 14. The edges of the flashing preferably extend at least six inches from the seam between the adjoining roof surfaces so that the flashing 20 can be nailed in place. Adhesive or sealants may also be used either alone or in conjunction with nails to secure the valley flashing 20 to the valley 14.

As indicated above, the valley flashing 20 may be formed of a longitudinal piece of galvanized tin or steel or of copper and preferably has a simple single crease formed down it is center so that it may conform to the valley. However, currently in the construction trades it is preferred to utilize a valley flashing 20 that is formed in a complex "W" shape as illustrated in FIG. 2. This "W" shape may be either bent or rolled as the case may be and is usually supplied to a building site in the preformed condition.

In addition, another function of the valley flashing 20 is to act as a channel or sluiceway for water that is falling onto the roof. As can be appreciated, the valley 14 forms a natural channel between the two adjoining roof sections and water and debris flowing down the roof during a rainstorm will naturally flow towards and through the valley 14. Therefore, it is desirable to trim the roofing materials, in the case of FIG. 1 shingles, back from the center of the valley 14 so that relatively smooth valley flashing 20 will form a flow channel having dramatically less flow resistance than would a flow channel formed of a shingle or other roofing materials. In this manner, water and debris may quickly be removed from the roof, thereby avoiding damage to the roof itself.

Unfortunately, given the nature of many roofing materials and especially standard asphalt shingles, the quickest and most flexible manner in which the shingles may be trimmed away from the center of the valley is by hand. Referring again to FIG. 1, a typical pattern for laying roofing materials and particularly shingles over a valley 14 is illustrated. In laying shingles, the installer begins at the lowest edge of a roof and works upward, laying each subsequent course of shingles over an upper edge of the preceding course of shingles. Each course of shingles is manually laid parallel to one another, typically using a chalk line as a guide. When the shingle installer approaches a valley 14, one common practice is to lay the shingles on both sides of the valley 14 completely over the valley 14, being careful not to nail the shingles through the portions of the valley flashing 20 that must remain watertight. After the shingles have been laid over the entire roof the shingle installer will return to the valley 14, snap a chalk line at the predetermined offset distance from the center of the valley flashing 20, and then will proceed to cut the shingles by hand using a utility knife. Alternatively, a roofing installer will first shingle only that portion of the roof that lies to one side of the valley 14. Once the first side of the valley 14 has been shingled, the roofing installer will then trim the installed shingles to the predetermined offset distance. This procedure will then be repeated along the remaining side of the valley 14. While the exact amount of time necessary to trim the shingles away from a valley can vary depending upon whether it is cold and the shingles are hard and stiff, or whether it is warm and the shingles are pliable, it is not uncommon for a twenty-foot section of roof valley to require more than one half hour for a single roofing installer to properly trim. Not only is this work time consuming, but it is also physically demanding and requires a great attention to detail so that the shingles can be trimmed neatly and evenly and so that damage to the flashing can be avoided.

In order to speed the cutting of shingles abutting a roof valley, manufacturers have come up with various types of knives designed for use roofing installers. These designs include knuckle guards, specially hooked blades, and the like. While a number of these improvements do increase the safety and possibly even the efficiency of cutting shingles at a predetermined offset from the valley by hand, the job still requires an inordinate amount of time and is still quite labor intensive.

Another device that is used by shingle installers to cut shingles at a predetermined offset from a valley 14 is a large cutting shear-type device having a base and a cutting arm that is utilized to cut shingles much like a paper cutter cuts paper. Using this device, a roofing installer lays shingles up to and just short of the roof valley and measures and cuts each individual shingle prior to installation to form a uniform shingle offset from the center of the roof valley. As can be appreciated, use of this shingle cutting mechanism is somewhat safer than using a utility knife to cut the shingles after they have been emplaced. However, use of a shear-like cutting device requires the roofing installer to measure and fit each shingle individually along an entire roof valley. Given the large quantity of roof valleys typically present on a roof, the additional measuring and fitting steps may actually increase the amount of time necessary for a roofing installer to install shingles adjacent to a roof valley.

Accordingly, it can easily be seen there is a need for a shingle cutting mechanism that can be used to cut the shingles after they have been laid over a roof valley and which requires no individual measuring and fitting. Preferably such a device will utilize a power saw and will enable the rapid and efficient cutting of the shingles adjacent to a roof valley.

Roof valleys 14 are not the only locations on a building's roof where the roofing materials must be trimmed. Other locations where the roofing materials must be trimmed include the roof's ridgeline, the gable end of a roof, and at the ridge of a hip roof. See FIGS. 3, 3*a*, and 3*b*. Presently, roofing materials such as shingles that are laid at each of these locations are trimmed using a utility knife as described above for the trimming of roofing materials at the roof valleys. Again, it can easily be seen that there is a need for a mechanism that will allow the neat and efficient trimming of roofing materials at these locations.

OBJECT OF THE INVENTION

Therefore, it is object of the invention to provide a cutting guide for use with a power saw that will allow a roofing installer to automatically cut roofing material such as shingles at a roof valley at a predetermined offset distance. This cutting guide will be required to cleanly cut the roofing materials 12 without damaging the valley flashing 20, the sheathing material 16 of the roof, or the remaining roofing materials themselves. Furthermore, a suitable cutting guide mechanism must be easy to use and faster than the known devices and methodologies for trimming roofing materials at a roof valley It is another object of the present invention to provide a cutting guide for use with a power saw that can be used to trim roofing materials at the gable end of a roof at a predetermined offset from the fascia boards and drip edge typically used to trim out the gable ends of roofs. Again, such a cutting guide must permit the neat and efficient cutting of the roofing materials avoiding damage to the fascia boards, drip edge, the sheathing of the roof itself, and any damage to the remaining roofing materials.

These and other objectives and advantages of the invention will appear more fully from the following description, made in conjunction with the accompanying drawings wherein like reference characters refer to the same or similar parts throughout the several views.

SUMMARY OF THE INVENTION

A cutting guide which satisfies the objects of the present invention generally comprises a mounting plate, a post, and a base. The mounting plate of the cutting guide is constructed and arranged to be coupled to a power saw that has a blade for cutting roofing materials. The mounting plate also has an aperture formed therethrough that permit the blade of the power saw to pass through the mounting plate. The post of the cutting guide is secured to and extends from the mounting plate in general alignment with the blade of the power saw. Preferably the post will be sized to follow the blade into a kerf cut into the roofing materials being trimmed. The base of the cutting guide is coupled to the post and has at least one lateral edge that is a positioned at a predetermined distance from the blade in a substantially parallel relation therewith. The predetermined distance between the blade and the lateral edge of the base of the cutting guide is most often the a desired offset distance between a centerline of a roof valley and an offset edge of a roofing material. This predetermined distance is often between two and six inches. In addition, it is contemplated that the base may be made adjustable to accommodate various offset distances.

Preferably, the base is constructed and arranged such that a leading edge thereof is positioned forward of a cutting edge of the blade. In this manner, the leading edge of the base will precede the cutting edge of the blade as the blade cuts the roofing materials. In addition, the base of the will be interposed between the blade and a surface upon which the saw guide is placed without obstructing a forward portion of a cutting edge of the blade. This structure will prevent the blade from cutting a roof surface while the roofing materials are being cut.

Where so desired, an auxiliary shoe may be affixed to the underside of the base. Where this is the case, the shoe will be arranged such that at least one lateral edge thereof is positioned at a predetermined offset distance from the saw blade and in substantially alignment with a cutting direction of the saw blade. It is preferred that a portion of the leading edge of the base or auxiliary shoe that is located away from the center of the roof valley that is being used as a reference surface in trimming the roofing materials be angled rearward to permit the remaining portion of the base adjacent the center of the roof valley to be inserted between the shingles and the roof before the outer portion.

The present invention may be configures as a contiguous apparatus for trimming roofing materials without exceeding the broad scope of the present disclosure. Such a contiguous apparatus for trimming roofing materials may comprise a saw having a motor for turning a saw blade mounted in a chassis. A post is coupled to the chassis of the saw and extending generally downward therefrom in general alignment with the blade of the saw. A base is coupled to the post and has at least one lateral edge positioned a predetermined offset distance from the blade. The at least one lateral edge of the base will be substantially parallel to a cutting direction of the blade. It is envisioned that the angle of the blade with regard to the chassis of the saw be adjustable as will the predetermined distance between the at least one lateral edge of the base and the blade. The base may also comprise an auxiliary shoe coupled to its underside. Such an auxiliary shoe will have at least one lateral edge that is positioned at a predetermined offset distance from the cutting blade in substantially aligned with a cutting direction of the cutting blade.

Another embodiment of the cutting guide comprises a modular structure in which the mounting plate, post, and base may be coupled together or taken apart at need. The mounting plate of this modular embodiment is preferably constructed and arranged to be utilized as a relatively large foot plate for a power saw that is useful in trimming roofing materials at a roof ridge or at the ridge formed by a hip roof.

One optional feature of the present invention comprises a lifter block that has an upwardly beveled leading edge. The lifter block or blocks are positioned at the base of the post so as to deflect an object being cut by the blade away from the post of the cutting guide and hence, away from the blade.

A method of trimming roofing materials to a predetermined offset distance from a roof structure comprising the steps of providing a power saw having a cutting guide for guiding a blade of a power saw coupled thereto that is constructed according the principles of the present invention, inserting the base of the cutting guide between the roof and the roofing materials disposed thereon with the at least one lateral edge abutting the roof structure from which the offset distance is measured and, moving the blade of the power saw along the roof structure while maintaining contact between the at least one lateral edge of the base of the cutting guide and the roof structure from the which the offset distance is measured. This method typically takes advantage of the roof valley to act as a guiding roof structure. Roof valleys almost always have installed thereover a valley flashing against which the lateral edge of the base of the cutting guide may be abutted to set the predetermined offset distance from the center portion of the valley flashing.

Alternatively, where roofing materials such as shingles are being trimmed at the gable end of a roof, the cutting guide can be made to abut against the drip edge or fascia of the gable end of the roof to locate the predetermined offset distance.

A method of trimming roofing materials to a predetermined offset distance from a roof structure at the gable end thereof comprises essentially the same steps set forth above. However, in one embodiment of the present invention, the base or shoe of the cutting may be provided with a fin that will abut the drip edge or fascia of the gable end of the roof. In this instance the base of the cutting guide is inserted between the roof and the roofing materials disposed thereon such that the fin that extends from the base of the cutting guide will abuts the roof structure from which the offset distance is measured, i.e. the drip edge or fascia. The blade is then moved along the roof structure while maintaining contact between the fin of the base of the cutting guide and the roof structure from the which the offset distance is measured.

Another embodiment of the cutting guide may be set up to trim roofing materials at the gable end of a roof with little or no modification of the guide. In this embodiment of the cutting guide, the base of the cutting guide is set upon the roofing materials disposed upon the roof with the at least one lateral edge of the base abutting the roof structure from which the offset distance is measured, i.e. the drip edge or fascia of the gable end of the roof. The blade is then moved along the roof structure while maintaining contact between the at least one lateral edge of the base of the cutting guide and the roof structure from the which the offset distance is measured.

Where no roof structure against which the cutting guide may be abutted is present, the cutting guide may be used freehand. In this situation, the roofing installer will identify the location of the offset distance or the location of the trim needed, the base of the cutting guide will be inserted between the roof and the roofing material disposed thereon and, the blade of the power saw will be moved along the roof so as to cut the roofing materials at the location of the identified location.

While the present invention may be used in conjunction with a standard saw blade, it is preferred to utilize a specialized saw blade that designed to cut roofing materials and especially relatively tacky roofing materials such as asphalt shingles without creating a great deal of swarf that can clog a saw. One such blade comprises a hub having a bore for mounting the blade upon a saw arbor formed therethrough wherein the hub has extending radially therefrom a plurality of fingers. Each finger has a projection that extends perpendicular to the plane of the fingers to which are coupled a plurality of spring wires. The spring wires are secured about the projections extending from the fingers to define a cutting edge of the blade. The spring wires are biased so as to spring back after coming into cutting contact with the roofing materials.

Another suitable saw blade comprises a circular saw blade that has a leading edge that is substantially coincident with a radius of the blade. The leading edge of the teeth of the blade comprise a cutting edge that is either beveled or perpendicular to a face of the saw blade.

Yet another suitable saw blade has a tooth profile in which a leading edge of each tooth is angled away from the direction of rotation, with the leading edge being beveled to form sharp cutting edge for slicing a work piece. The cutting edge of the teeth may be a continuous curve or a discontinuous cutting edge having two or more facets.

DESCRIPTION OF THE DRAWINGS

FIG. 2 is a cross sectional view of a typical roof valley flashing having a "W" cross sectional shapes;

FIG. 2a is a cross sectional view of a roof valley flashing having a simple crease formed there along to conform to the roof valley;

FIG. 2b is a cross sectional view of a rolled roof valley flashing that is gently radiused to conform to the roof valley;

FIG. 3 is a plan view of roof comprising a gable end a hip end;

FIG. 3a is a perspective view of a gable end of the roof of FIG. 3;

FIG. 3b is a perspective view of the hip end of the roof of FIG. 3;

FIG. 6 is an end elevation of the cutting guide of FIG. 5;

FIG. 7 is a top, plan view of the cutting guide of FIG. 5;

FIG. 15 is a sectional view of a saw blade useful in cutting asphaltic roofing materials;

FIG. 15a is a cross section view of a tooth of the saw blade of FIG. 15;

FIG. 16 is a sectional view of a saw blade useful in cutting asphaltic roofing materials;

FIG. 16a is a cross section view of a tooth of the saw blade of FIG. 15;

FIG. 17 is a sectional view of a saw blade useful in cutting asphaltic roofing materials;

FIG. 17a is a cross section view of a tooth of the saw blade of FIG. 15;

FIG. 18 is a sectional view of a saw blade useful in cutting asphaltic roofing materials; and, FIG. 18a is a cross section view of a tooth of the saw blade of FIG. 15.

DETAILED DESCRIPTION

Although the disclosure hereof is detailed and exact to enable those skilled in the art to practice the invention, the physical embodiments herein disclosed merely exemplify the invention, which may be embodied in other specific structure. While the preferred embodiment has been described, the details may be changed without departing from the invention, which is defined by the claims.

Figure 4:
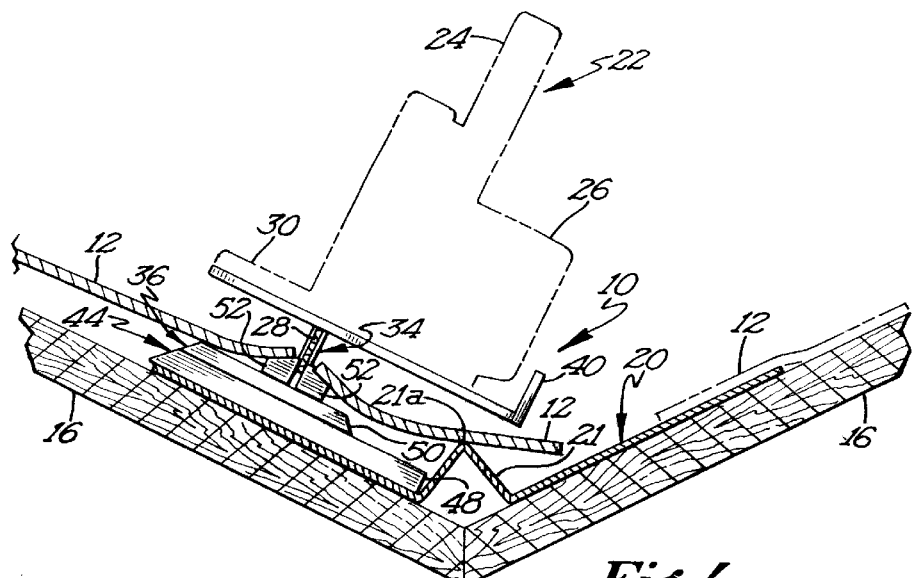
FIG. 4 is an schematic cross section illustration of a cutting guide constructed according to the present invention being used to cut an offset into roofing materials, in this case shingles, that overlie a roof valley flashing; FIX BEVELED EDGE

FIG. 4 illustrates a saw cutting guide 10 in use to cut roofing materials 12 in a roof valley 14. As described above in conjunction with FIG. 1 and FIGS. 2, 2a and 2b, a roof valley 14 is defined as the concave juncture between two downwardly depending roof sections. As can be seen in FIGS. 2–2b, roof valley 14 is schematically represented as the joint between two portions of roof sheathing 16 that are typically abutted to form a seam 18. Because the seam 18 represents a leak point for most roof structures, it is common practice to seal this seam 18 with a valley flashing 20. FIGS. 2–2b illustrate three common types of valley flashing 20. FIG. 2 illustrates a type of valley flashing that is presently very popular with the building trades. The valley flashing 20 illustrated in FIG. 2 has a "W" shape cross-section with a vertically raised rib 21 formed at its center. FIG. 2a illustrates a relatively simpler valley flashing 20 having a single crease 22 formed at its center and which overlies the seam 18. FIG. 2b illustrates yet an even simpler, rolled valley flashing 20, which has no crease or rib formed therein.

Valley flashing 20 typically extends at least six inches from the seam 18 formed in the roof valley 14. This extension of the flashing material allows the valley flashing to be secured to the roof sheathing 16 by nailing near its edges. The distance at which the flashing is nailed to the roof sheathing 16 from the seam 18 is typically set by local building code, but as a general rule it is preferable to nail the valley flashing 20 to the roof sheathing 16 at least six inches from the seam or as far from the seam 18 as is possible. These dimensions in the flashing 20 prevent water from entering the roof seam 18 though the nail holes formed through the valley flashing 20. When installing roof materials 12 such as the shingles illustrated in FIG. 1 over the sheathing 16 of a roof, it is common practice for the roofing installers to lay the roofing materials 12 over the valley flashing 20. After the roof has been completely covered with the roofing material 12, the roofing installer will measure a predetermined offset distance from the seam 18 of the roof valley and will snap a chalk line on the roofing material 12 to either side of the seam 18. Local building codes or customs typically dictate that the roofing materials 12 must trimmed back from the seam 18 to a predetermined offset distance that is usually approximately two inches. The roofing installer with then use a utility knife or other manual cutting device such as a pair of hand shears to make the offset cut in the roofing materials 12 at the predetermined offset distance from the seam 18

The saw cutting guide 10 of the present invention obviates the need for the time consuming and labor intensive cutting of the required roofing material offsets by permitting the use of a power saw 22 to cut the roofing materials 12. The power saw 22 typically comprises a chassis 24 that supports a motor 26 that in turn rotates a cutting blade 28. The chassis 24 of the power saw 22 is supported upon a footplate 30. Those skilled in the art will recognize the power saw 22 as being a standard circular saw of the type commonly used in the building trades. However, other types of saws may be adapted for use with the present invention. In particular, it is envisioned that the cutting guide of the present invention may be incorporated wholesale with a power saw to create a dedicated and contiguous roofing material cutting tool. Accordingly, the scope of the present invention is not to be limited to the embodiment of the present invention, which is adapted for use with a standard circular saw.

The cutting guide 10 of the present invention is constructed and arranged to support the power saw 22 such that the blade 28 of the power saw 22 is positioned at a predetermined offset distance as measured from the seam 18 of the roof valley 14. The saw cutting guide 10 of the present invention in its most basic form comprises a mounting plate 32 that is constructed and arranged to couple thereto the power saw 22, a post 34 that depends downwardly from the mounting plate 32 in substantial alignment with the blade 28 of the power saw 22, and a base 36 that supports the power saw 22 and the saw cutting guide 10 and which also determines the offset distance between the blade 28 and the seam 18 of the roof. The cutting guide 10 of the present invention is best illustrated in FIGS. 5–7.

The mounting plate 32 is simply a flat plate that is constructed and arranged to couple thereto the footplate 30 of a power saw 22. For this purpose, attachment slots have been formed through in the mounting plate 32. The attachment slots 38 are elongated to provide sufficient movement of the footplate 30 of the power saw 22 relative to the mounting plate 32 so that the blade 28 of the power saw 22 might be brought into substantial alignment with the post 34 of the saw cutting guide 10. Typically a standard machine screw with either a wing nut or standard nut will be used to secure the power saw 22 to the mounting plate 32, though any equivalent structure suitable for securing the saw 22 to the mounting plate 32 may be substituted therefore. One preferred structure for securing the saw 22 to the mounting plate 32 involves the use of a crescent shaped hold-down (not shown) that has a bore formed through its center. The hold-downs are captured on the machine screws or bolts used to secure the saw to the mounting plate 32 between the wing nut and the mounting plate 32. In use, one end of each crescent bears against the mounting plate 32 while the other end is placed over the foot plate 30 of the saw 22 so as to exert clamping pressure thereon when the wing nut is tightened.

Figure 5:
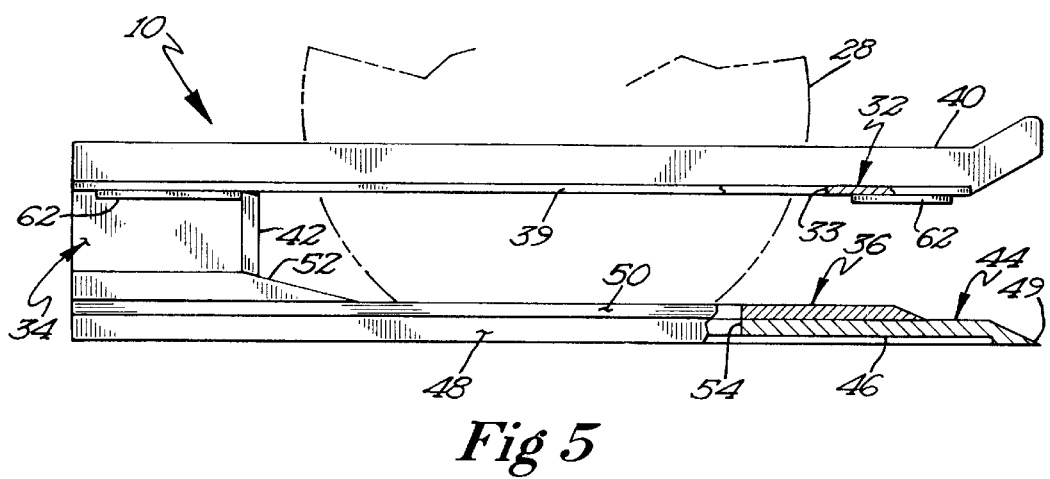
FIG. 5 is a side elevation of a preferred embodiment of the cutting guide of the present invention.

In the embodiments illustrated in FIGS. 5–7, the mounting plate 32 is also provided with a bridge guide 40 that is secured to a lateral edge 39 of the mounting plate 32. The bridge guide 40 has a number of functions including reinforcing mounting plate 32, acting as a guard to prevent a roofing installer's hands from coming into contact with the saw blade 28, and as an indicator for assisting a roofing installer in making an offset or trimming cut in a roofing material 12. It is to be understood that while the bridge guide 40 provides many beneficial features, it is an optional structure that may be omitted where so desired.

The mounting plate 32 is provided with a blade slot 33 through which the blade of a power saw 22 might extend. While the blade 28 may extend through the blade slot 33 in a variety of angles limited only by the adjustability of power saw 22 itself, it is preferred that the plate 28 extend through the blade slot 33 in a perpendicular relation to the mounting plate 33.

The mounting plate 32 is supported upon a post 34 that is coupled to, and depends downwardly from the undersurface of the mounting plate 32. The post 34 has a leading edge 42 that is typically disposed adjacent the blade 28 of the power saw 22. The leading edge 42 of the post 34 is preferably tapered and vertical in nature. However, it is envisioned that the leading edge 42 of the post 34 may be formed so as to conform to the curve of the saw blade 28. Given the nature of the function of the saw cutting guide 10 of the present invention, it is preferred that the width of the post 34 be substantially the same as the kerf or width of the cutting blade 28. It is to be understood, however, that in some instances, it may be preferable to utilize a post 34 that is somewhat wider than the kerf of the blade 28 or more preferably still, to use a post 34 that is narrower than the kerf of the plate 28. Furthermore, while there may exist some misalignment between the blade 28 and the post 34, it is preferred that the blade 28 be inserted through the blade slot 33 in the mounting plate 32 in such a manner that the blade 28 and the post 34 are substantially co-planar with one another. In this manner, as the blade 28 is pushed through a cut in the roofing material 12, the post 34 will follow the blade through the kerf made by the blade 28 in the roofing materials 12 and will not bind in the cut or otherwise deflect the cutting path of the blade 28.

The entire saw cutting guide 10 is supported by the base 38 which is secured to the distal end of the post 34. It is preferable that the base 36 be secured to the post 34 in a planar parallel relation to the mounting plate 32, however, it is anticipated that various embodiments may require that the base be positioned in an attitude that is nonparallel with the mounting plate 32. Furthermore, the relationship between the mounting plate 32 and the base 36 may be made adjustable where so desired. It is preferred that the connection between the mounting plate 32, post 34, and the base 36 be substantially rigid so that blade 28 will not move in relation to the base 36 when the cutting guide 10 is in use. Preferably, the saw guide 10 of the present invention will be formed of easily machinable and yet sturdy metallic materials including aluminum, steel, and other ferrous and non-ferrous metals. It is also contemplated, however, that various composite materials including fiber-reinforced resins may be utilized to manufacture a suitable saw cutting guide 10.

In the preferred embodiment of the present invention, the base 36 is provided with a shoe 44 that is secured directly to the undersurface of the base 36. The shoe 44 typically comprises a relatively slippery and non-marring material such a phenolic or an ultrahigh molecular weight plastic. Consequently, not only will the cutting guide 10 slide along the valley flashing 20 more easily, but it will also prevent scratches from occurring in the flashing material 20. The bottom surface of the shoe 44 may be either smooth, i.e. planar, or may include one or more longitudinal grooves 46. The grooves illustrated in FIGS. 5 and 6 terminate prior to intersecting the beveled leading edge 49 of the shoe 44. In another alternative embodiment, the grooves 46 may extend all the way through the shoe 44 and intersection leading edge 49 thereof. The grooves act to prevent granules of the roofing material 12 from being trapped between the shoe and the flashing 20, thereby preventing scratches to the flashing. While not illustrated in FIG. 5 or 6, it is preferred to form a chamfer in the leading edge 49 of the shoe 44 on the corner of the leading edge of the shoe positioned away from the center of the valley 14. As can be appreciated, the roofing materials 12, as they are laid over the valley 14 are biased away from the sheathing 16 of the roof near the valley. The distance between the roofing materials 12 and the roof is at its maximum over the seam 18 of the valley 14 and gradually becomes smaller farther away from the seam 18. The chamfered portion of the leading edge 49 allows the portion of the leading edge closer to the seam 18 to be inserted beneath the roofing materials 12 where there exists a larger gap between the roofing materials 12 and the flashing 20 adjacent the seam 18 of the roof valley 14. The outside, chamfered portion of the leading edge 49 of the shoe 44 is therefore more easily inserted between the roofing materials 12 and the flashing 20, thereby minimizing any catching of the shoe 44 on the roofing materials 12 as an offset cut is made.

The base 36 and shoe 44 not only support the saw 22 and guide the blade 28 though the offset cuts made in the roofing materials 12, but also prevent the saw blade 28 from coming into contact with the valley flashing 20 or the sheathing 16 of the roof. Where the base 36 is made from a relatively hard ferrous or nonferrous metal, it is preferable to form a slot 54 into or even through the base 36 and the shoe 44. This slot 54 is dimensioned and positioned such that the blade 28 may extend downwardly into the slot without danger of cutting the base 36 or shoe 44. This also prevents the situation whereby a relatively thin roofing material may pass between the base 36 and the blade 28 without being cut or without being fully cut. It is important that the depth of the saw blade 28 be monitored so that it does not extend into the base 36 or shoe 44 or into the sheathing 16 of the roof, as such damage may require extensive and costly repairs to the roof before it may be completed.

The lateral edges 48 of the shoe 44 are constructed and arranged to be substantially parallel to the plan of the cutting blade 28 of the saw 22. Furthermore the distances between the blade 28 and the lateral edges 48 of the shoe 44 are predetermined distances that are informed by the required offset distance imposed by local building codes or practices. While in the present invention this predetermined distance is fixed at approximately two to six inches, it is to be understood that the distance between the saw blade 28 and the lateral edges 48 of the shoe 44 may be infinitely adjustable, or may be set at different distances for each of the respective lateral edges 48 of the shoe 44. It is important to keep in mind that the lateral edges 48 of the shoe 44, or the lateral edges 50 of the base 36 where the shoe 44 is omitted or combined into a unitary base structure, must be kept parallel to the plane of the cutting blade 28 in order to prevent binding of the blade 28 in the kerf, wandering of the cut being made by the blade 28, or potentially dangerous situations such as kickback or jamming of the saw blade 28.

It is important to note that the structure of cutting guide 10 of the present invention may be modified to accommodate various types or models of power saws 22. In some steeper pitched roofs, it is possible that the motor 26 of the saw 22 may contact the roofing materials 12, thereby preventing good contact between the cutting guide 10 and the flashing 20.

Figure 1:
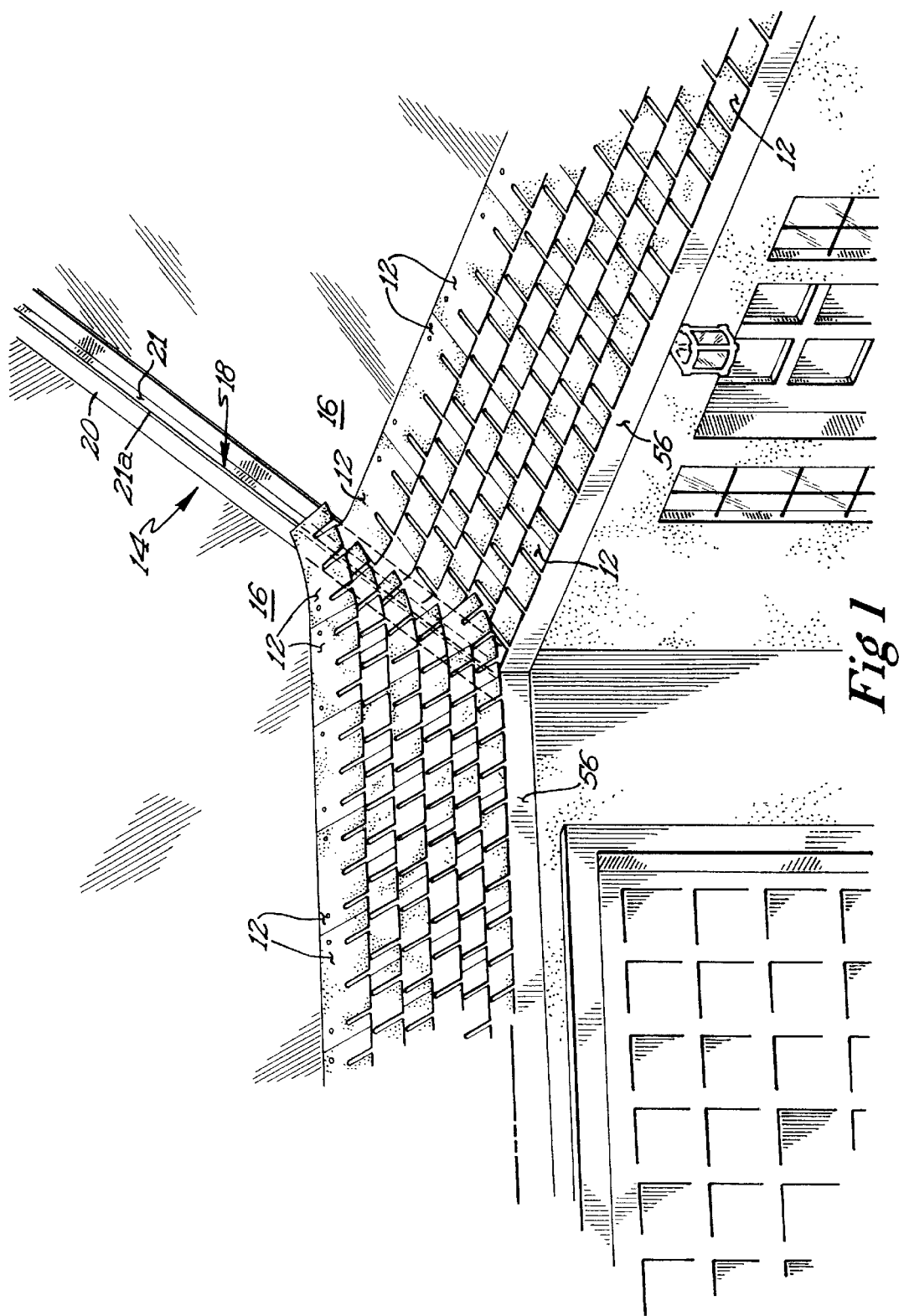
FIG. 1 is a perspective view of a typical roof valley illustrating how shingles on adjoining roof sections are lapped over a roof valley prior to cutting an offset into the shingles to create a flow channel through the roof valley.

The use of the saw cutting guide 10 of the present invention is best illustrated in FIG. 4. In FIG. 4, it can be seen that the roofing material 12, in this case shingles, has been laid over the valley flashing 20 used to seal the seam 18 of the roof valley 14. In FIG. 4, the shingles have been laid only on a single side of roof valley 14 whereas in FIG. 1 a double overlay of the shingles 12 is illustrated. The saw cutting guide 10 of the present invention will work equally well in either situation. Furthermore, FIGS. 1 and 4 illustrate a roof valley flashing 20 having a central rib 21 formed therein. While the use of the saw cutting guide will be described specifically as applied to this type of roof flashing 20, the present invention may be utilized with other types of roof flashing such as those illustrated in FIGS. 2–2b.

In operation, the leading edge 49 of the shoe 44 is inserted beneath the roofing materials 12 such that the shoe 44 rides directly upon the valley flashing 20. The lateral edge 48 of the shoe 44, or lateral edge 50 of the base 36 as the case may be, is abutted directly against the central rib 21 of the valley flashing 20 or against the crease formed in the center of the valley flashing 20 to create the necessary offset between the seam 18 of the roof valley 14 and the cutting blade 28. The saw 22 having the cutting guide 10 attached thereto is then directed along the roof valley 14 such that the lateral edge 48 of the shoe 44 remains in constant contact with the central rib 21 of the valley flashing 20 along the entire length of the roof valley 14. In this manner, the offset between the seam 18 and the edge of the roofing material 12 is cleanly and efficiently cut in a time measured in minutes rather than in hours.

Preferably, a roof installer will attach the roofing materials 12 to a roof in a manner illustrated in FIG. 1. In this setting, a roofing installer preparing to cut the roofing materials 12 at the required offset distance from the seam 18 of the roof valley 14 will begin the first cut at either the bottom or the top of one the sides of roof valley 14. Once the first cut is finished, the roofing installer will typically reverse directions and begin the second cut of the roofing materials at the end of the valley 14 where the first cut ended. The roofing installer will finish the second cut through the roofing material 12 at the starting position of the first cut. Alternatively, and where the lateral edges 48 of the shoe 44 are arrange equidistant from the blade 28, the roofing installer may start both roofing material offset cuts at the same end of the roof valley 14.

In some instances, such is where a flashing 20 of the type illustrated in FIG. 2b is utilized to seal the roof valley seam 18, there will be no crease or central rib 21 to guide the saw cutting device 10 of the present invention. In these instances, the roof installer will be required to mark out the location of the desired offset cuts to be made through the roofing material 12 such as by snapping a chalk line at each of the offset cut locations. The offset cuts may then be made free hand with the saw 22 supported upon the saw cutting guide 10. Other examples of where this free hand cutting style may be required include situations where local building codes or practices dictate that the offset cuts should taper away from the seam 18 of the roof valley 14 from the top of the valley 14 towards its lower end.

Many types of roofing materials 12 are manufactured from petroleum based products, such as asphalt or tar. Consequently, saw blades 28 tend to become quickly gummed up when cutting such tacky substances. Therefore, it is preferable to utilize a saw blade 28 having an extremely thin kerf. In this manner, the quantity of roofing material that may foul the blade or otherwise clog the saw can be minimized. Alternatively or in addition, especially designed blades constructed and arranged to throw swarf (material removed in the cutting process) out of the kerf and away from the saw blade 28 may also be utilized. In either case, it is preferable to make any offset cut in petroleum based roofing materials or any other relatively tacky roofing materials when the temperature of those roofing materials 12 is relatively low. The lower temperatures reduce the tackiness of the roofing materials 12 and further prevent the clogging or fouling of the blade 28 and saw 22. Another means for reducing the amount of clogging or fouling of the saw blade 28 and saw 22 is to provide a zero-clearance insert (not shown) in the blade slot 33 formed through the mounting plate 32. Such a zero clearance insert will prevent swarf from the roofing materials 12 from being thrown up into the chassis 24 of the saw 22. In addition blade brushes (not shown) may be mounted adjacent the blade 28 to remove roofing materials that may have become adhered to the blade 28 itself.

Figure 13:
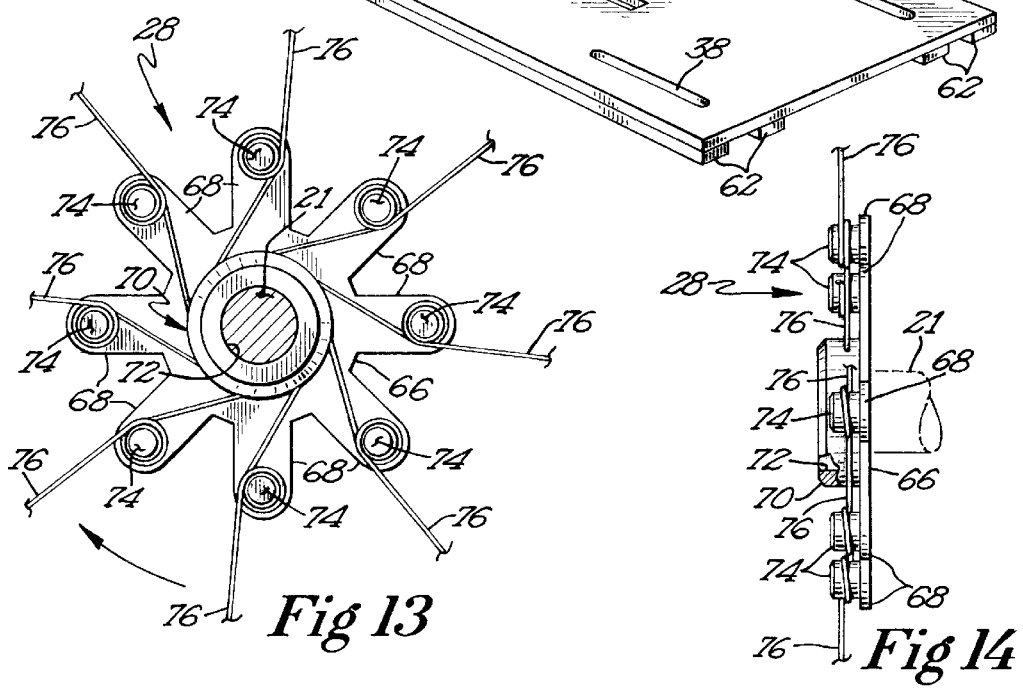
FIG. 13 is an elevation of a saw blade useful in cutting asphaltic roofing materials.
Figure 14:
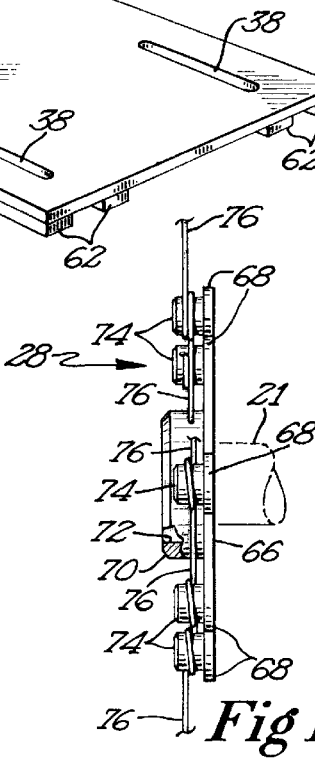
FIG. 14 is a side view of the saw blade of FIG. 13.

FIGS. 13 and 14 illustrate a saw blade 28 constructed and arranged specifically for cutting asphalt based roofing materials 12 such as shingles. The saw blade 28 illustrated in FIGS. 13 and 14 comprises a solid hub 66 having a plurality of fingers 68 extending radially therefrom. In the embodiment illustrated in FIGS. 13 and 14, the fingers 68 number eight and are spaced equidistantly about the hub 66. Any number of fingers 68 may be used, so long as the hub 66 may be balanced for spinning at the high speeds typical of circular saw blades 28. Hub 66 has a raised collar portion at its center that has a bore 72 formed therethrough. The bore 72 is sized to fit over the drive shaft 21 of a power saw 22. Each of the fingers 68 has a projection 74 around which is secured a spring steel wire 76. As can be seen, the spring steel wire 7 acts as the cutting edge of the blade 28. Wires 76 are substantially rigid and yet are sufficiently flexible to bend before breaking when in use. The wires 76 are secured around the projections 74 and are spring biased, in the illustrated embodiment of FIGS. 13 and 14, in a clockwise cutting direction. As the wires 76 spin upon the hub 66, the hardened tips of the spring steel wires 76 will easily bite into and cut through asphalt based roofing materials 12. More importantly, because of the spring biasing of the wires 76 and because the blade 28 illustrated in FIGS. 13 and 14 has no gullet between adjoining teeth as do the teeth of standard saw blades, swarf generated in cutting asphalt based roofing materials 12 will be thrown from the kerf at a tangent to the circular shape defined by the tips of the spinning wires 76 rather than be carried up into the saw 22 itself. Furthermore, any asphaltic material that should become adhered to the wires 76 will not degrade the cutting ability of the wires 76 as fast or as completely as built up tar and asphalt on a standard cutting blade.

Where relatively thick roofing materials 12 such as multi-layered shingles are used, it becomes particularly important to prevent the binding of the blade 28 within the kerf of the offset cut. Therefore, it is preferred to provide a pair of lifters 52, one on either side of the base of the post 34 so as to deflect the cut edges of the roofing material 12 away from the blade 28 and post 34. Not only does this prevent fouling of the blade 28 by minimizing contact between the blade 28 and the roofing materials 12, but also minimizes friction caused by contact of the roofing materials 12 with the post 34. Consequently, the saw blade 28 may be advanced more easily through the roofing materials 12 and fouling of the blade 28 is minimized.

Figure 8:
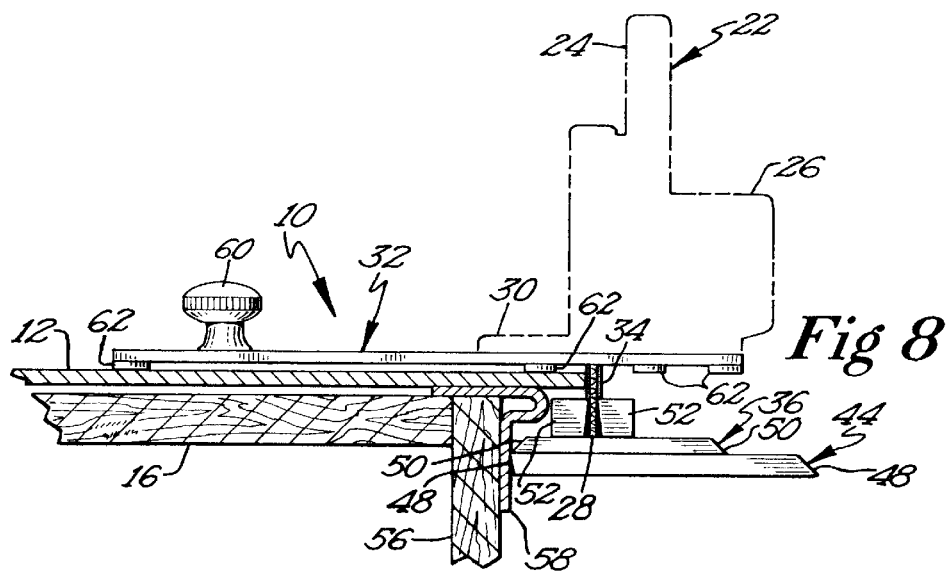
FIG. 8 is an illustration of an embodiment of the present invention configured for trimming roofing materials at the gable end of a roof in use.
Figure 9:
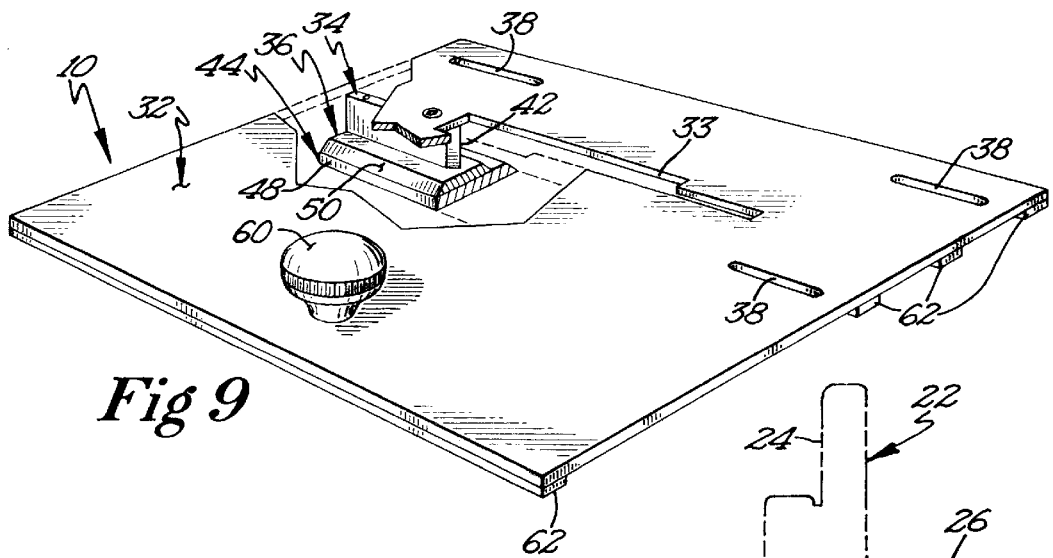
FIG. 9 is a perspective view of the embodiment of the cutting guide of the present invention illustrated in FIG. 8.

In an alternate embodiment illustrated in FIGS. 8–9, the cutting guide 10 of the present invention can be configured to trim roofing materials 12 such as shingles at the gable end 8 of a roof. FIGS. 3 and 3a illustrate the gable end 8 of a roof. The sheathing material on a gable end 8 of a roof terminates in a fascia board 56 as illustrated in FIG. 8. A drip edge 58 is affixed to the roof sheathing 16 and to the fascia boards 56 and prevents water from entering between the roofing material 12 and the sheathing 16. In many areas, roofing materials 12 such as shingles are laid such that they extend beyond a predetermined preferred distance past the drip edge 58. Therefore, the excess roofing material 12 must be trimmed back to maintain a neat appearance at the gable end 8 of the roof. The embodiment of the cutting guide 10 of the present invention illustrated in FIG. 8 comprises an elongate mounting plate 32 that is constructed and arranged so as to ride over the top of the roofing material 12 when trimming the roofing material 12 as illustrated in FIG. 8. The elongate mounting plate 32 illustrated in FIG. 8 is also provided with a handle or knob 60 that permits a user of the device to maintain the cutting guide over the sheathing 16. The elongate mounting plate and handle 60 help to counteract the tendency of the saw and cutting guide to want to tip off the edge of the roof.

As also can be seen in FIG. 8, the cutting guide 10 illustrated therein also comprises a post 34, having a base 36 and a shoe 44 secured thereto as described above in conjunction with FIG. 4. Note that the embodiment of the cutting guide 10 illustrated in FIG. 8 may also be utilized to trim roofing material 12 at the valley 14 of a roof as illustrated in FIG. 4. The elongate mounting plate 32 is also provided with a plurality of runners 62 that are affixed to the underside of the mounting plate 32 to assist in moving the cutting guide 10 along the surface of the roofing materials 12.

In operation, the user of the cutting guide 10 illustrated in FIG. 8 will have to begin at a location along the gable end 8 of the roof where the roofing materials 12 that overhang the drip edge 58 have been cut back to allow the user to locate the cutting guide 10 and saw 22 as illustrated in FIG. 8. In addition for purposes of safety and of accuracy, it is desired to have as much of the elongate plate 22 in contact with the roofing material 12 through its runner 62 as is possible at all times. As illustrated in FIG. 8, the lateral edges 48 of the shoe 44 or the lateral edges 50 of the base 36 are abutted against the drip edge 58 so as to locate the blade 28 a predetermined distance from the gable end of the roof. As indicated above, the base 36 or shoe 44 may be fixed in a given position, or may be adjustable so as to permit the roofing material 12 to be trimmed at any desired dimension.

It is important to note that when the cutting guide 10 is to be adapted for use in trimming the roofing materials 12 along the gable end of a roof, it is preferred that the blade 28 of the saw 22 be aligned in a flush relationship with the side of the post 34 that is adjacent the drip edge 58. While possible, it would be difficult to cut the roofing material 12 along the gable end of the roof were the post 34 to extend significantly past the saw blade toward the drip edge 58. It can be envisioned that some insubstantial quantitative offset between the surface of the post 34 adjacent the drip edge 58 and the blade 28 may be accommodated without degrading the quality or ease of trimming the roofing materials 12. However it is preferred that in this embodiment the blade 28 be identical in width to that of the post, or at the very least be aligned in a planar parallel fashion with the surface of the post 34 that is adjacent to the drip edge 58.

Figure 10:
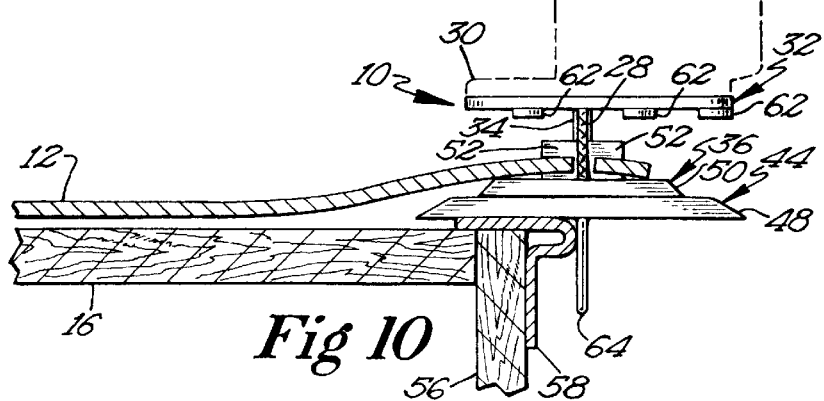
FIG. 10 is an illustration of yet another embodiment of the cutting guide of the present invention configured for trimming roofing materials at the gable end of a roof in use.

FIG. 10 illustrates yet another embodiment of the cutting guide that has been adapted for use in trimming roofing materials at the gable end 8 of a roof. In this embodiment, a fin 64 is coupled to the bottom surface of the shoe 44. This fin is preferably perpendicular to the shoe 44 and can be adjusted laterally to set the distance from the drip edge 58 at which the blade 28 will cut the roofing materials 12. In one embodiment, the shoe 44 may be removed from the base 36 and replaced with a secondary shoe having a fin 60 integrally formed therewith. Alternatively, the fin 64 may be bolted, screwed, or otherwise affixed to the shoe 44 or base 36 in any known manner.

In operation, the base 36 and/or shoe 44 of the embodiment of the cutting guide 10 illustrated in FIG. 10 is inserted between the roofing materials 12 and the sheathing 16 of the roof. The base 36 and/or shoe 44 of the cutting guide 10 are inserted laterally between the roofing material 12 and sheathing 16 of the roof until the fin 64 abuts against the drip edge 58. Note that in this method for trimming the roofing materials 12 at the edge of the gable end 8 of the roof, it will be necessary to leave the roofing material 12 unattached near the end of the gable edge. Typically, the roofing material will be secured to the sheathing 16 as by nails immediately adjacent to the edge of the gable end 8 of the roof. Where the embodiment of the cutting guide 10 illustrated in FIG. 10 is used to trim the roofing material 12 adjacent to the gable end of the roof, the base 36 and/or she 44 would be obstructed by the nails used to secure the roofing materials 12 to the sheathing 16. Therefore, these nails or other fasteners must be omitted until after the roofing material 12 has been trimmed.

As can be appreciated, where the fin 64 is laterally adjustable, the location at which the roofing material 12 is to be cut by the blade 28 can easily be controlled. For example, in FIG. 10, where the fin 64 is moved towards the right, the base 36 and hence the blade 28 will be located farther to the left. Where the fin 64 is adjusted towards the left, the insertion of the base 36 between the roofing material 12 and the sheathing 16 is minimized and the location of the blade is moved towards the right. Again, it is necessary to ensure that the side of the blade 28 and the side of the post 34 adjacent to the drip edge 58 are substantially aligned for the reasons given above. In addition, it is preferred that the side of the fin 64 abutting the drip edge 58 be arranged substantially parallel to the blade 28 and post 34, however the parallel arrangement between the fin 64 and the blade 28 and post 34 need not necessarily be in a planar fashion.

Figure 11:
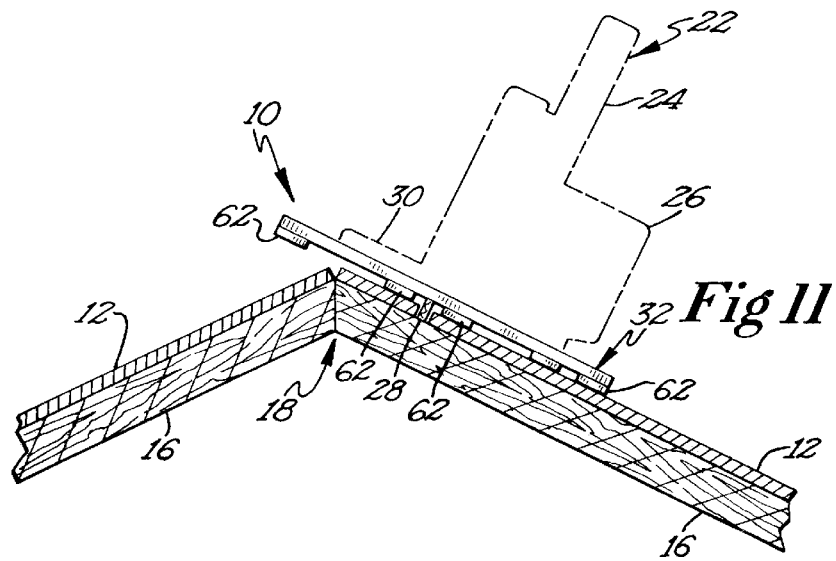
FIG. 11 is an illustration of an embodiment of the cutting guide of the present invention configured for trimming roofing materials adjacent the ridge line of a roof or at the ridge of a hip roof.

In yet another embodiment of the present invention illustrated in FIGS. 11 and 12, the post 34 and subsequently the base 36 and shoe 44 of the cutting guide 10 may be removed from the mounting plate 32. The remaining mounting plate 32 therefore comprises a substantially larger contact surface than does the foot plate 30 of the saw 22. The mounting plate 32, as illustrated in FIGS. 10 and 11, may then be used to assist the freehand cutting of the roofing materials 12 adjacent the seam 18 formed in a hip roof as illustrated in FIG. 3b. As can be seen in FIG. 11, the roofing material 12 is trimmed away from the seam 18 of the hip roof so as to allow a ridge cap or similar structure to be placed over the seam 18 to prevent the entrance of water into a building through the seam 18.

Note that this embodiment of the cutting guide 10 illustrated in FIG. 11 and may be a part of a modular cutting guide 10 in which the mounting plate 32, post 34, and base 36 may be connected and disconnected at will. Alternatively, the mounting plate 32 illustrated in FIGS. 11 and 12 may be a specially configured structure that simply aids in the accurate and safe cutting of the roofing materials 12 at or near a ridge in a roof.

Figure 12:
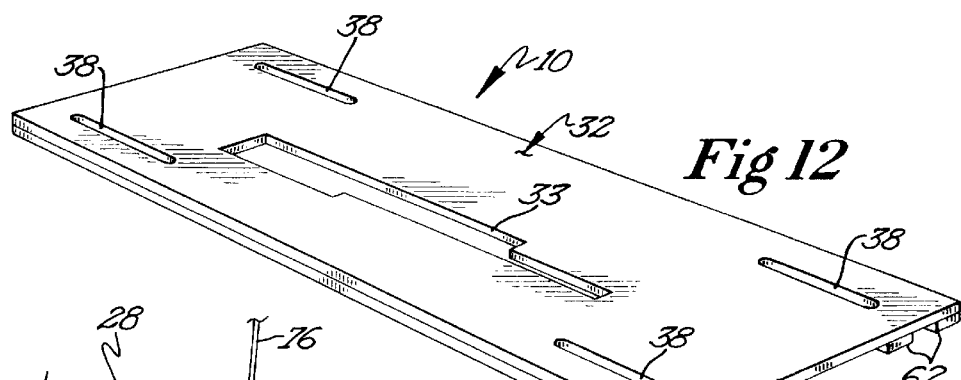
FIG. 12 is perspective view of an embodiment of the cutting guide of the present invention illustrated in FIG. 11.

When using the embodiment of the cutting guide 10 illustrated in FIGS. 11 and 12, it is necessary to carefully set the blade depth to avoid cutting into the sheathing 16 of the roof. Therefore, the blade's depth should be set to no more than the thickness of the roofing materials 12.

FIGS. 15–18a illustrate various embodiments of saw blades 28 that are specially configured for cutting roofing materials 12 and especially asphaltic roofing materials. One feature of the blades 28 illustrated in FIGS. 15–18a is that these blades lack the traditional hooked teeth of typical saw blades. It is believed that be removing the hook in the teeth of the blades 28 illustrated in FIGS. 15–18a, the teeth will eject swarf from the kerf being cut through the roofing materials 12 onto the roof surface rather than into the power saw 22. Such an ejecting action will have the benefit of preventing the clogging of the power saw 22 due to the buildup of swarf within the chassis 24 of the saw.

FIG. 15 illustrates a blade 28 having a square shaped tooth pattern. Each tooth 78 of this blade 28 has a substantially straight leading edge 80 having no forward hook. In addition, it will be noted that the number of teeth 78 in the blade 28 illustrated in FIG. 15 is relatively low. This also assists in clearing the swarf from the blade 28. FIG. 15a illustrates a cross-section of the tooth 78. Note that the cutting edge 82 of the tooth 78 is linear and perpendicular to the face of the blade 28 This type of cutting edge 82 acts similar to a chisel in that it removes roofing materials 12 from the kerf of the blade by chipping the roofing materials from the kerf.

FIG. 16 comprises yet another embodiment of a blade 28 having a cutting edge that is inclined radially inwardly in the direction of rotation of the blade 28. This type of cutting edge 82 has a shearing action and will effectively slice roofing materials 12. While not as aggressive as a chisel type cutting edge 82 such as that illustrated in FIG. 15, this slicing action helps to prevent the formation of large quantities of swarf, and therefore prevents the buildup of swarf on the saw 22 and saw blade 28. FIG. 16a illustrates the cross section of the tooth 78 of the blade embodiment of FIG. 16.

FIG. 17 illustrates another embodiment of a slicing type blade 28. The teeth 78 of the blade 28 of FIG. 17 have a curved cutting edge 82 that also prevents the formation of large quantities of swarf. FIG. 17a illustrates the cross section of the tooth 78 of the blade embodiment illustrated in FIG. 17.

FIG. 18 comprises a blade 28 having teeth 78 with a cutting edge that comprises the entire leading edge 80 of each tooth 78. The leading edge 80 and the cutting edge 82 of the teeth 78 of the blade embodiment illustrated in FIG. 18 are beveled and coincident with the radius of the blade 28 and therefore comprise a compromise between the chisel-like action of the saw teeth 78 illustrated in FIG. 15 and the slicing action of the saw teeth illustrated in FIGS. 16 and 17. A cross section of the cutting and leading edges 80, 82 of the saw teeth 78 of FIG. 18 is illustrated in FIG. 18a.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A cutting guide for a saw comprising:
   a mounting plate constructed and arranged to be coupled to a saw having a blade for cutting, the mounting plate having an aperture formed therethrough to permit the blade to pass through the mounting plate;
   a post extending from the mounting plate in general alignment with the blade of the saw; and
   a base coupled to the post, the base having at least one lateral edge that is a predetermined distance from the blade, the at least one lateral edge of the base being substantially parallel to a culling direction of the blade and wherein the base is constructed and arranged to be interposed between the blade and a surface upon which the saw guide is placed without obstructing a forward portion of a cutting edge of the blade.

2. The cutting guide of claim 1 where the predetermined distance between the lateral edge of the base and the blade comprises a desired offset distance between a centerline of a roof valley and an offset edge of a roofing material.

3. The cutting guide of claim 1 wherein the predetermined distance between the blade and the lateral edge of the base is between two and six inches.

4. The cutting guide of claim 1 wherein the base is constructed and arranged such that a leading edge thereof is positioned forward of a cutting edge of the blade.

5. The cutting guide of claim 2 wherein the predetermined distance between the at least one lateral edge of the base may be modified to accommodate various offset distances.

6. The cutting guide of claim 1 wherein the post is constructed and arranged to follow the cutting blade into a kerf cut by the saw blade through a roofing material.

7. The cutting guide of claim 1 wherein the base has coupled to a bottom surface thereof an auxiliary shoe having at least one lateral edge positioned at a predetermined offset distance from the cutting blade, the at least one lateral edge of the auxiliary shoe being substantially aligned with a cutting direction of the cutting blade.

8. The cutting guide of claim 1 further comprising at least one lifter block having an upwardly beveled leading edge, the at least one lifter block being positioned at the base of the post so as to deflect an object being cut by the blade away from the post of the cutting guide.

9. The cutting guide of claim 1 further comprising a fin extending from the underside of the base in general alignment with the blade of the power saw.

10. The cutting guide of claim 1 further comprising a fin that is removably secured to the underside of the base a predetermined offset distance from the blade of the power saw.

11. The cutting guide for a saw of claim 1 wherein the predetermined offset distance between the at least one lateral edge and the blade is such that the blade is centered on a roof valley where the culling guide is used to cut a roofing material at the roof valley.

12. A The cutting guide for a sew of claim 1 wherein the predetermined offset distance between the at least one lateral edge and the blade is such that the blade is offset from the center of a roof valley where the cutting guide is used to cut a roofing material at the roof valley.

13. A device for trimming shingles adjacent a roof valley comprising:
   a cutting guide for guiding a blade of a circular saw through the shingles parallel to the roof valley at a predetermined offset distance from the center of the roof valley, the cuffing guide itself comprising:
      a mounting plate constructed and arranged to couple the cutting guide to a foot plate of the circular saw, the mounting plate having an aperture formed therethrough to permit the blade of the circular saw to pass through the mounting plate;
      a post extending from the mounting plate in general alignment with the blade of the circular saw;
      a base coupled to the post, the base having at least one lateral edge that is positioned at the predetermined distance from the blade, the at least one lateral edge of the base being substantially parallel to a cutting direction of the blade; and,
      at least one lifter block having an upwardly beveled leading edge, the at least one lifter block being secured to the cuffing guide at a selected side of the post immediately adjacent the base, the upwardly beveled leading edge of the at least one lifter block acting to bias shingles being cut by the blade of the circular saw away from the blade.

14. The device for trimming shingles adjacent a roof valley of claim 9 wherein the base is provided with an upwardly beveled leading edge.

15. The device for trimming shingles adjacent a roof valley of claim 10 wherein a portion of the leading edge of the base located away from the center of the roof valley is angled rearward to permit the remaining portion of the base adjacent the center of the roof valley to be inserted between the shingles and the roof first.

16. A modular cutting guide for a saw comprising:
   a mounting plate constructed and arranged to be coupled to a saw having a blade for cutting, the mounting plate having an aperture formed therethrough to permit the blade to pass through the mounting plate;

a post removably coupled to and extending from the mounting plate in general alignment with the blade of the saw; and a base removably coupled to the post, the base having at least one lateral edge that is a predetermined distance from the blade, the at least one lateral edge of the base being substantially parallel to a cutting direction of the blade.

17. The modular cutting guide of claim 16 wherein the mounting plate is constructed and arranged to be utilized as a relatively large foot plate of a power saw.

18. A cutting guide for a saw comprising:

a mounting plate constructed and arranged to be coupled to a saw having a blade for cutting, the mounting plate having an aperture formed therethrough to permit the blade to pass through the mounting plate, the mounting plate being further constructed and arranged to support the cutting guide upon a surface;

a post extending from the mounting plate in general alignment with the blade of the saw wherein the post is constructed and arranged to follow the saw blade into a kerf cut by the saw blade through a flexible material; and a base coupled to the post, the base having at least one lateral edge that is a predetermined distance from the blade, the at least one lateral edge of the base being substantially parallel to a cutting direction of the blade and wherein the at least one lateral edge touches an edge of the surface on which the cutting guide is supported.

* * * * *